I. H. TAYLOR.
FEED BAG ADJUSTING MECHANISM.
APPLICATION FILED JAN. 3, 1912.
1,098,304.
Patented May 26, 1914.
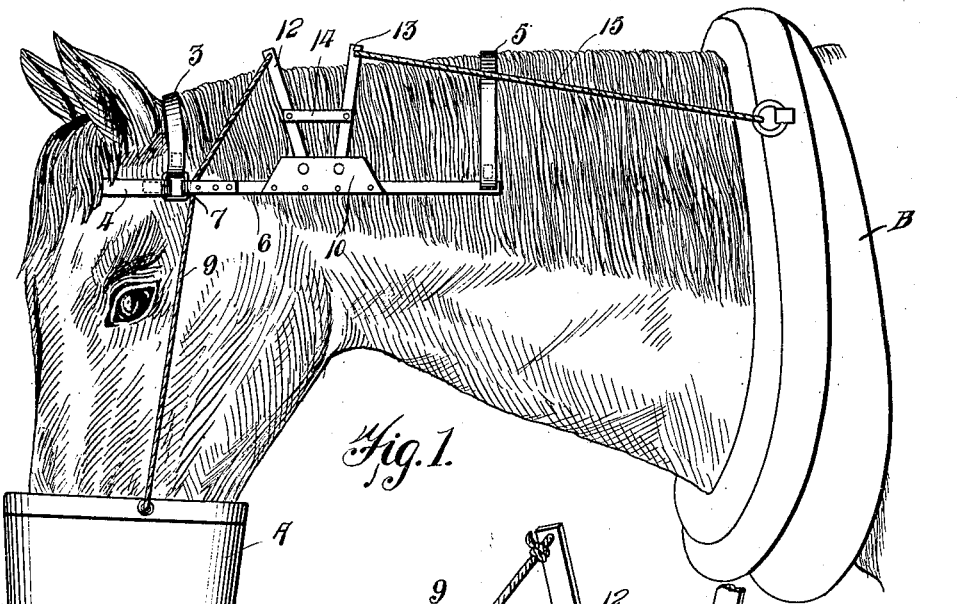
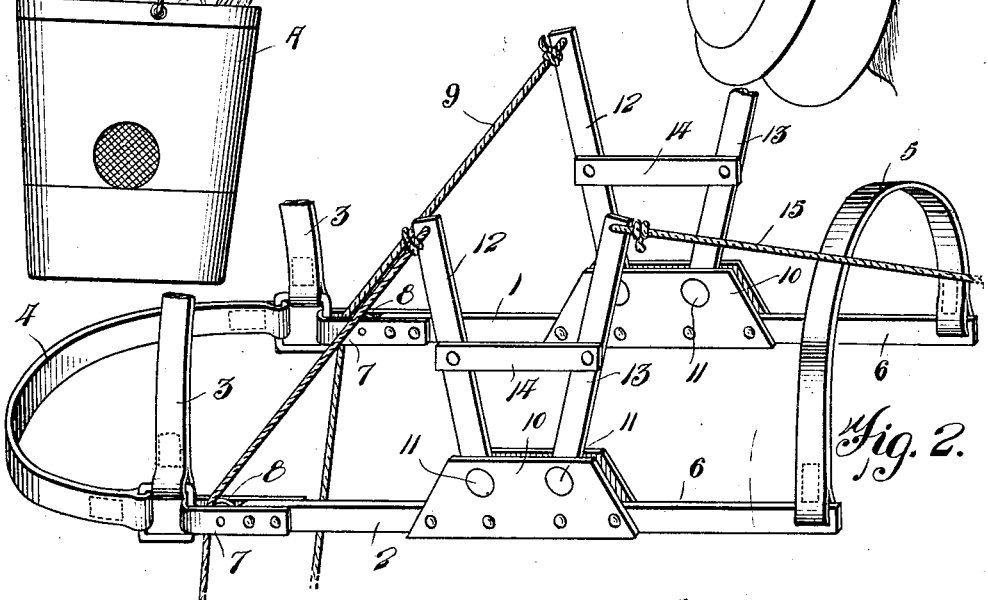
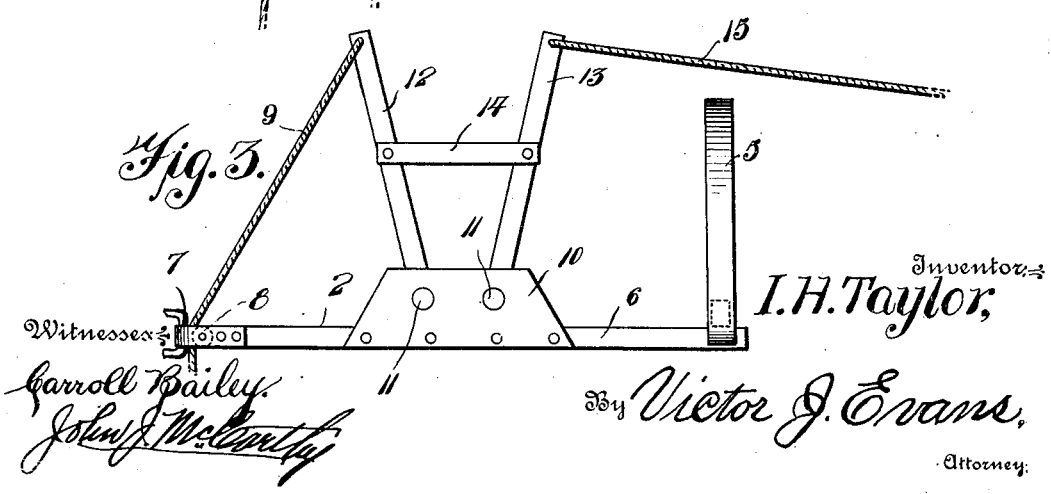
Witnesses:
Carroll Bailey.
John J. McCarthy
Inventor:
I. H. Taylor,
By Victor J. Evans,
Attorney.

UNITED STATES PATENT OFFICE.

ISAM H. TAYLOR, OF SHREVEPORT, LOUISIANA.

FEED-BAG-ADJUSTING MECHANISM.

1,098,304.  Specification of Letters Patent. Patented May 26, 1914.

Application filed January 3, 1912. Serial No. 669,242.

*To all whom it may concern:*

Be it known that I, ISAM H. TAYLOR, a citizen of the United States of America, residing at Shreveport, in the parish of Caddo and State of Louisiana, have invented new and useful Improvements in Feed-Bag-Adjusting Mechanisms, of which the following is a specification.

The present invention comprehends improvements in feed bags and has particular application to an adjusting mechanism for feed bags.

In carrying out the present invention, it is my purpose to provide an adjusting mechanism for feed bags which shall have connections with the feed bag and be supported upon the head of an animal, in the application of the feed bag, and be capable of operating to move the feed bag in an upward direction in the downward movement of the head of the animal when the level of the feed within the bag has been lowered. Furthermore, I aim to provide an adjusting mechanism for feed bags which shall be supported upon the head of an animal, in the application of the feed bag thereto, and have connections with the hames or other suitable part of the harness to render the mechanism operative in the downward movement of the horse's head, incident to the lowering of the level of the feed within the bag, to move the feed bag in an upward direction.

A further object of the invention is the provision of a mechanism of this character which shall embody identically constructed companion devices arranged upon the opposite sides of the head of the animal and connected with the feed bag and with the harness to effect the operation of the mechanism to raise the feed bag in the lowering of the animal's head, incident to the lowering of the level of the feed within the bag, whereby to retain the bag in position to facilitate the feeding of the animal without unnecessary waste of feed.

With the above and other objects in view which shall appear as the description progresses, the invention consists in the construction, combination and arrangement of parts hereinafter set forth in and falling within the scope of the appended claim.

In the accompanying drawing forming a part of this specification; Figure 1 is a side elevation of an adjusting mechanism constructed in accordance with the present invention, applied to the head of an animal and supporting the feed bag. Fig. 2 is a detail perspective view of the mechanism detached from the animal's head, and Fig. 3 is a detail side elevation of one of the companion devices.

Similar reference characters designate like parts throughout the several views.

Referring to the drawings in detail, in which has been illustrated what I consider to be the preferred embodiment of the invention, the mechanism as shown embodies companion devices 1 and 2 designed to be applied to the opposite sides of the animal's head and supported thereon at one end through the medium of an interconnecting head band 3 and brow band 4. The opposite or inner ends of the devices 1 and 2 are interconnected through the medium of a neck band 5 adapted to rest upon the neck of an animal. Thus it will be seen that the mechanism, as a whole, is securely held to the head of an animal and prevented from accidental movement.

As each of the devices 1 and 2, forming the adjusting mechanism, is of identical construction, it is thought that a description of one will suffice for both. Each of these devices consists of a main supporting bar 6 arranged horizontally of the animal's head and provided at its outer end with an inverted U-shaped strip 7 riveted or otherwise suitably secured to the bar 6 and carrying a sheave or pulley 8 over which is trained a cord 9 connected at its lower end with the feed bag A. Rigidly secured to the opposite sides of each bar 6 and projecting in a relatively upward direction from the said bar, is a pair of spaced plates 10 between which are pivotally mounted, as at 11, 11, levers 12 and 13 projecting normally at substantially right angles to the bar 6 and pivotally connected to one another through the medium of a link 14 arranged normally parallel with the main supporting bar. The pivotal connection of the lever 12 is in a plane coincident with that of the lever 13 with the plates 10 and the former has its free end formed with an eye to which is connected the free end of the cord 9, while to the free end of the lever 13 is connected a cord 15. The opposite ends of the cords 15 are adapted to be secured to the connecting rings of the hames B at the upper ends of the latter, it being of course understood that the cord 15 may be connected with any other part of the harness if such is desired.

In use, the feed bag A is applied to the mouth of the animal and the bands 3, 4 and 5 secured in position to properly position the adjusting mechanism upon the head of the animal above the feed bag. When the level of the feed within the bag has been lowered, incident to the feeding of the animal, the said animal, instinctively, lowers its head in order to feed itself and in so doing, the cord 15 will act to pull the levers 13 and 12 in a rearward direction, through the medium of their connecting link 14, whereby an upward movement of the bag is brought about the medium of the cord 9 traveling upon the sheave or pulley 8 in the U-shaped strip 7 at the outer end of the bar 6. Thus, it will be seen, that the bag is automatically elevated to insure the proper feeding of the animal and to prevent the waste of the food therein, it being understood of course that the devices 1 and 2 are arranged upon the opposite sides of the head of the animal and coact with one another to facilitate the movement of the bag as described.

From the foregoing description, taken in connection with the accompanying drawing the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the appended claim.

Having thus described my invention, what I claim and desire to secure by Letters-Patent is:

A device of the character described comprising a feed bag, oppositely arranged elongated bars, an adjustable head band secured to one end of said bars, a brow band secured at right angles relatively to said head band, two upstanding brackets mounted intermediate the ends of said bars, two horizontally disposed pivots mounted on each of said brackets, a pair of upwardly diverging levers fulcrumed upon the pivot carried by each of said brackets, a brace member connecting said upright levers in separated relation, a pulley mounted upon each of said bars at the rear of said head band, a neck band connecting the free ends of said bars, flexible elements secured at one end to the upper extremities of one lever of each of said pairs of levers, and flexible members secured at one end to the upper end of the remaining levers of said pairs, said last named flexible members passing over said pulley, and being secured at their free end upon said feed bag.

In testimony whereof I affix my signature in presence of two witnesses.

ISAM H. TAYLOR.

Witnesses:
I. W. TAYLOR,
JIM BROWN.

---

Copies of this patent may be obtained for five cents each, by addressing the "Commissioner of Patents, Washington, D. C."